US012152322B2

(12) United States Patent
Samosir et al.

(10) Patent No.: US 12,152,322 B2
(45) Date of Patent: Nov. 26, 2024

(54) METHODS FOR FABRICATION OF ARTICLES FROM THREE-DIMENSIONAL MODELS

(71) Applicant: Global Apparel Partners Inc., Malibu, CA (US)

(72) Inventors: William Samosir, Brooklyn, NY (US); Lawrence Panozzo, San Antonio, TX (US); Spencer Sherk, Brooklyn, NY (US); Garrett Li Gerson, Malibu, CA (US)

(73) Assignee: Global Apparel Partners Inc., Malibu, CA (US)

( * ) Notice: Subject to any disclaimer, the term of this patent is extended or adjusted under 35 U.S.C. 154(b) by 0 days.

(21) Appl. No.: 18/311,816

(22) Filed: May 3, 2023

(65) Prior Publication Data

US 2023/0357969 A1    Nov. 9, 2023

Related U.S. Application Data

(60) Provisional application No. 63/364,158, filed on May 4, 2022.

(51) Int. Cl.
*D04B 15/70* (2006.01)
*G06F 30/10* (2020.01)
*G06F 113/12* (2020.01)

(52) U.S. Cl.
CPC ............. *D04B 15/70* (2013.01); *G06F 30/10* (2020.01); *G05B 2219/45194* (2013.01); *G06F 2113/12* (2020.01)

(58) Field of Classification Search
CPC ........ D04B 37/00; D04B 37/02; D04B 15/66; D04B 15/70; D04B 15/78; G05B 2219/45194; G06F 2113/12
(Continued)

(56) References Cited

U.S. PATENT DOCUMENTS 4,856,104 A    8/1989    Stoll et al.
7,203,566 B2   4/2007    Terai et al.
(Continued)

FOREIGN PATENT DOCUMENTS

EP    2 463 422 B1    5/2016
EP    1 956 129 B1    8/2016
(Continued)

OTHER PUBLICATIONS

"Pattern Software M1PLUS", STOLL, brochure, 2022, downloaded from: https://www.stoll.com/fileadmin/user_upload/pdfs/Brochures_english/M1plus_15_gb.pdf, 15 pgs.
(Continued)

*Primary Examiner* — Danny Worrell
(74) *Attorney, Agent, or Firm* — Ascenda Law Group, PC

(57) ABSTRACT

Methods for fabrication of articles, in particular knitted articles, using computer-controlled machines. A 3D model of the article is characterized by a 3D polygonal mesh defining a surface of the 3D model. A streamline is drawn on the 3D model, and used to define a set of isolines over the surface described by the 3D polygonal mesh. The isolines are quantized into equidistant points along their respective lengths and a cut line traversing each of the isolines is defined. Courses are defined by connecting quantization points of the isolines based on knitting rules to produce a 2D knitting map containing apexes. Apex attraction may be performed on a first portion of the 2D knitting map by decreasing a spatial distance between respective ones of the apexes. The 2D knitting map is subsequently converted to knitting instructions for a computer-controlled knitting machine.

12 Claims, 14 Drawing Sheets

(58) Field of Classification Search
USPC .............................. 700/141, 131, 132, 135
See application file for complete search history.

(56) References Cited

U.S. PATENT DOCUMENTS

| | | | |
|---|---|---|---|
| 7,460,927 | B1 | 12/2008 | Lai |
| 7,657,341 | B2 | 2/2010 | Lind |
| 7,738,990 | B2 | 6/2010 | Furukawa et al. |
| 8,151,236 | B2 | 4/2012 | Su et al. |
| 9,681,694 | B2 | 6/2017 | Ng et al. |
| 10,626,530 | B2 | 4/2020 | Terai et al. |
| 10,636,206 | B2 | 4/2020 | Chen et al. |
| 11,293,124 | B2* | 4/2022 | Morgan .................. G06F 30/00 |
| 11,969,042 | B2* | 4/2024 | Waldie ................... A41H 3/007 |
| 2005/0131571 | A1 | 6/2005 | Costin |
| 2018/0020752 | A1 | 1/2018 | Peshek et al. |
| 2019/0208862 | A1 | 7/2019 | Poegl et al. |
| 2019/0368085 | A1 | 12/2019 | Morgan et al. |
| 2019/0382931 | A1* | 12/2019 | Karmon ................. D04B 37/00 |
| 2020/0233994 | A1 | 7/2020 | Terai et al. |
| 2023/0250567 | A1 | 8/2023 | Harwood et al. |
| 2023/0357969 | A1* | 11/2023 | Samosir ................ D04B 15/70 |

FOREIGN PATENT DOCUMENTS

| | | |
|---|---|---|
| EP | 3 547 264 A1 | 10/2019 |
| GB | 2596868 A | 1/2022 |
| WO | 2022/129920 A1 | 6/2022 |

OTHER PUBLICATIONS

Bose; et al., "A survey of geodesic paths on 3D surfaces", Computational Geometry, 2011, 44:486-498.

Colin; et al., "Shortest Cut Graph of a Surface with Prescribed Vertex Set", Proc. Europ. Symp. on Algorithms, 2010, 13 pgs.

Crane; et al., "The Heat Method for Distance Computation", Communications of the ACM, Nov. 2017, 60(11):90-99.

Crane; et al., "Geodesics in Heat", ACM Transactions on Graphics, vol. 32, No. 5 (2013), arXiv: 1204.6216v2 [cs.GR] Sep. 12, 2012, 10 pgs.

Gupta; et al., "Prototyping knit tensegrity shells: a design-to-fabrication workflow", SN Applied Sciences, 2020, 2:1062, 13 pgs.

Igarashi; et al., "Knitting a 3D Model", Computer Graphics forum, Oct. 2008, 27(7):1737-1743.

Igarashi; et al., "Knitty: 3D Modeling of Knitted Animals with a Production Assistant Interface", Eurographics, 2008, 4 pgs.

Karmon; et al., "KNITIT: A Computational Tool for Design, Simulation, and Fabrication of Multiple Structured Knits", SCF '18: Symposium on Computational Fabrication, Jun. 17-19, 2018, Cambridge, MA, 10 pgs.

Kaspar, Alexandre, "Garment Design Workflows for On-Demand Machine Knitting", Massachusetts Institute of Technology, Sep. 30, 2021, Thesis paper, 304 pgs.

Kaspar; et al., "Knit Sketching: from Cut & Sew Patterns to Machine-Knit Garments", ACM Trans. Graph, Aug. 2021, 40(4):63:1-15.

Kaspar; et al., "Knitting Skeletons: A Computer-Aided Design Tool for Shaping and Patterning of Knitted Garments", JIST '19, Oct. 20-23, 2019, New Orleans, LA, pp. 53-65.

Kaspar; et al., "Supplementary Document: Knit Sketching: from Cut & Sew Patterns to Machine-Knit Garments", Computer Science, 2021, 9 pgs.

Kryven; et al., "Generating Knitting Patterns from a Sketch: a CSP Approach", International Symposium on Computational Aesthetics in Graphics, Visualization, and Imaging, Jul. 19, 2013, 9 pgs.

Kundu; et al., "Finding Shortest Isothetic Path Inside a 3D Digital Object", Lecture Notes in Computer Science, Mar. 2017, pp. 65-78.

Li; et al., "OptCuts: Joint Optimization of Surface Cuts and Parameterization", ACM Transactions on Graphics, Nov. 2018, 37(6):247:1-13.

Lin, Conner Zhizhen, "Periodic Conformal Parameterization", Carnegie Mellon University, Pittsburgh, PA, Thesis baper, Jul. 2019, 78 pgs.

Liu; et al., "Knitting 4D Garments with Elasticity Controlled for Body Motion", ACM Trans. Graph., 2021, 40(4):0:1-16.

Liu; et al., "Toward on integrally-formed knitted fabrics used for automotive seat cover", Journal of Engineered Fibers and Fabrics, 2021, 16:1-12.

Lucquin; et al., "SeamCut: Interactive Mesh Segmentation for Parameterization", SA '17 Technical Briefs, Nov. 27-30, 2017, Bangkok, Thailand, 4 pgs.

McCann; et al., "A Compiler for 3D Machine Knitting", SIGGRAPH '16 Technical Paper,, Jul. 24-28, 2016, Anaheim, CA, 11 pgs.

Narayanan; et al., "Automatic Machine Knitting of 3D Meshes" ACM Transactions on Graphics, Jan. 2018, 1(1):1:1-15.

Narayanan; et al., "Visual Knitting Machine Programming", ACM Trans. Graph, Jul. 2019, 38(4):63:1-13.

Popescu; et al. "Automated generation of knit patterns for non-developable surfaces", Humanizing Digital Reality (2018), Springer, Singapore, published Sep. 16, 2017, pp. 271-284.

Poranne; et al., "Autocuts: Simultaneous Distortion and Cut Optimization for UV Mapping", ACM Transactions on Graphics, Nov. 2017, 36(6):215:1-11.

Rehfeldt, D., "A Generic Approach to Solving the Steiner Tree Problem and Variants", Technische Universitat Berlin, Thesis paper, Nov. 2015, 185 pgs.

Rout; et al., "Methods for numerical simulation of knit based morphable structures: knitmorphs" Scientific Reports, 2022, 12:6630, pp. 1-11.

Saab; et al., "Shortest path planning on topographical maps", University of Missouri—Columbia, Thesis paper, May 1997, 56 pgs.

Sharp; et al., "Variational Surface Cutting", ACM Trans. Graph, Aug. 2018, 37(4):156:1-13.

Zhen; et al., "Prediction of Seamless Knitted Bra Tension", Fibers and Polymers, 2008, 9(6):785-792.

International Search Report and Written Opinion mailed Aug. 10, 2023, from the ISA/European Patent Office, for International Patent Application No. PCT/US2023/020886 (filed May 3, 2023), 15 pgs.

Written Opinion of the International Preliminary Examining Authority mailed Apr. 2, 2024, from the IPEA/European Patent Office, for International Patent Application No. PCT/US2023/020886 (filed May 3, 2023), 5 pgs.

International Preliminary Report on Patentability dated Jul. 22, 2024, from the IPEA/European Patent Office, for International Patent Application No. PCT/US2023/020886 (filed May 3, 2023), 42 pgs.

International Preliminary Report on Patentability dated Jul. 22, 2024, from the IPEA/European Patent Office, for International Patent Application No. PCT/US2023/020888 (filed May 3, 2023), 47 pgs.

International Search Report and Written Opinion mailed Aug. 10, 2023, from the ISA/European Patent Office, for International Patent Application No. PCT/US2023/020888 (filed May 3, 2023), 15 pgs.

Written Opinion of the International Preliminary Examining Authority mailed Apr. 2, 2024, from the IPEA/European Patent Office, for International Patent Application No. PCT/US2023/020888 (filed May 3, 2023), 5 pgs.

Non-Final Office Action dated Jul. 18, 2024, for U.S. Appl. No. 18/311,819, filed May 3, 2023, 21 pgs.

Sharp; et al., "You Can Find Geodesic Paths in Triangle Meshes by Just Flipping Edges", ACM Trans. Graph, Dec. 2020, 39(6):249:1-15.

Sheffer, Alla, "Spanning Tree Seams for Reducing Parameterization Distortion of Triangulated Surfaces", Proceedings SMI. Shape Modeling International 2002, May 17-22, 2002, 8 pgs.

Sheffer; et al., "Seamster: Inconspicuous Low-Distortion Texture Seam Layout", IEEE Visualization, 2002, 8 pgs.

Sure; et al., "Scan to Knit—From Body Scan Directly to the Knitting Machine", Proceedings of 3DBody.Tech 2020, 11th Int. Conference and Exhibition on 3D Body Scanning and Processing Technologies, Nov. 17-18, 2020, 10 pgs.

(56) References Cited

OTHER PUBLICATIONS

Ting, Cheung Chun, "3D Pattern for Knitted Objects", The Hong Kong Polytechnic University, Hung Hom, Kowloon, Hong Kong, Thesis paper, Jun. 2016, 144 pgs.
Wang; et al., "Freeform surface flattening based on fitting a woven mesh model", Computer-Aided Design, Jul. 2005, 37:799-814, pre-published version 27 pgs.
Wang; et al., "Surface Flattening Based on Energy Model", Computer-Aided Design, Sep. 2002, 34(11):823-833, pre-published paper, 16 pgs.
Wu; et al., "Stitch Meshing", ACM Trans. Graph., Aug. 2018, 37(4):130:1-14.
Wu; et al., "Wearable 3D Machine Knitting: Automatic Generation of Shaped Knit Sheets to Cover Real-World Objects", IEEE Transactions on Visualization and Computer Graphics, Sep. 1, 2022, 28(9): 3180-3192.
Yuksel; et al., "Stitch Meshes for Modeling Knitted Clothing with Yarn-level Detail", ACM Transactions on Graphics, Jul. 2012, 31(4):37, SIGGRAPH 2012, pp. 1-12.
Zheng et al., "Prediction of Seamless Knitted Bra Tension", Fibers and Polymers, 2008, 9(6):785-792.

\* cited by examiner

METHODS FOR FABRICATION OF ARTICLES FROM THREE-DIMENSIONAL MODELS

RELATED APPLICATIONS

This application is a non-provisional of, claims priority to, and incorporates by reference U.S. Provisional Application No. 63/364,158, filed 4 May 2022.

FIELD OF THE INVENTION

The present invention relates to the fabrication of articles using computer-controlled machines from instructions for such fabrication automatically generated from three-dimensional ("3D") models of said articles, and in particular, to methods for transforming 3D meshes associated with 3D models of articles into instructions for a computer-controlled flatbed knitting machine.

BACKGROUND

In many industries, customizations of articles for manufacture often require iterative and sometimes poorly documented construction processes. For example, the manufacture of bespoke footwear can be a labor intensive process that involves the meticulous taking of measurements of an individual's feet, creation of patterns and lasts for each foot, first in a temporary medium such as paper and later in a more permanent medium such as beechwood, creation of one or more prototypes from the lasts in inexpensive leather or other material, fitting of the prototypes and revising of the lasts based on needed alterations, and finally creation of the final footwear products from hand-selected leathers or other materials based on the finalized lasts. While some of these steps, such as the measurements of individuals' feet, have seen the application of modern technologies such as laser scanning, others, such as material selection, cutting and fitting to the lasts, still rely on the care and skill of learned tradespeople, steeped in the traditions of their predecessors. Many of the steps involved in such manufacture are only minimally documented in terms of their procedures, if at all. As a result, the overall manufacturing process can take weeks or months (or even longer for some materials) and is exceptionally difficult to replicate. It is also rather opaque from the standpoint of the client commissioning the customized work, which can be frustrating.

Despite the advent and adoption of computer-controlled manufacturing equipment in many industries, it remains the case that the production of customized articles by these machines still requires a significant amount of manual effort. For example, although computer-controlled knitting machines have been available for many years, producing customized knitted articles using such machines still requires manual pattern making and manual transforming of such patterns to knitting instructions for such machines (e.g., using commercially available software), often by highly specialized knitwear engineers. As a result, producing custom knitwear and other articles can take many weeks or months, and the process often requires iteration and reworking for changes in the article, such as the use of different yarns, or production on additional or different target knitting machines.

SUMMARY OF THE INVENTION

In accordance with one embodiment of the invention, a 3D model of an article may be characterized by a 3D polygonal mesh defining a surface of the 3D model. A streamline may be drawn on the 3D model, and used to define a set of isolines over the surface described by the 3D polygonal mesh. The isolines may be quantized into equidistant points along their respective lengths and a cut line traversing each of the isolines may be defined. Courses may be defined by connecting quantization points of the isolines based on knitting rules to produce a two-dimensional (2D) knitting map containing apexes.

In one embodiment, apex attraction may be performed on a first portion of the 2D knitting map by decreasing a spatial distance between respective ones of the apexes, causing the apexes to form a smoother edge of the 2D knitting map. A weight value received from a user may be used to tune an amount of apex attraction performed on the first portion of the 2D knitting map.

In one embodiment, apex diffusion may be performed on a second portion of the 2D knitting map separate from the first portion by increasing a spatial distance between respective ones of the apexes within the second portion, causing the apexes to form a more jagged edge of the 2D knitting map. A weight value received from a user may be used to tune an amount of apex diffusion performed on the second portion of the 2D knitting map.

These and other embodiments of the invention are described in more detail in the description below.

BRIEF DESCRIPTION OF THE DRAWINGS

The present invention is illustrated by way of example, and not limitation, in the figures of the accompanying drawings, in which.

DETAILED DESCRIPTION

The present invention addresses challenges, such as those described above, in the fabrication of articles using computer-controlled machines, and provides methods for such fabrication from instructions automatically generated from 3D models of said articles. In one embodiment, the present invention provides methods for transforming 3D meshes associated with 3D models of articles into instructions for a computer-controlled flatbed knitting machine.

As will become apparent in the following discussion of embodiments of the invention, various operations referred to herein are machine operations. Useful machines for performing the operations of the present invention include both the target fabrication machines which will produce the desired articles being constructed, and digital computer systems or other similar devices. The present invention involves, to some degree, the production of instructions for operating, that is controlling the operation of, the target fabrication machines to produce a desired result. Those instructions by which the target fabrication machine will produce the desired result are created, in part, using one or more programmed digital computer systems, which in some cases may intercommunicate with one another. For example, in one embodiment of the invention, a first computer system, referred to as a "client" is used to construct and/or customize a 3D model of the article to be fabricated, and that model is then passed to a second computer system, referred to as a "server" or "host," where the 3D model is converted to a 2D bitmap or other representation suitable for translation into instructions for the target fabrication machine. In other cases, a single digital computer system may be used for both aspects of the operation, for example in a service-as-a-platform based approach in which a client computer system is used merely as a visualization and instruction instrument to observe, direct, and control processes executing on a server.

Figure 4:
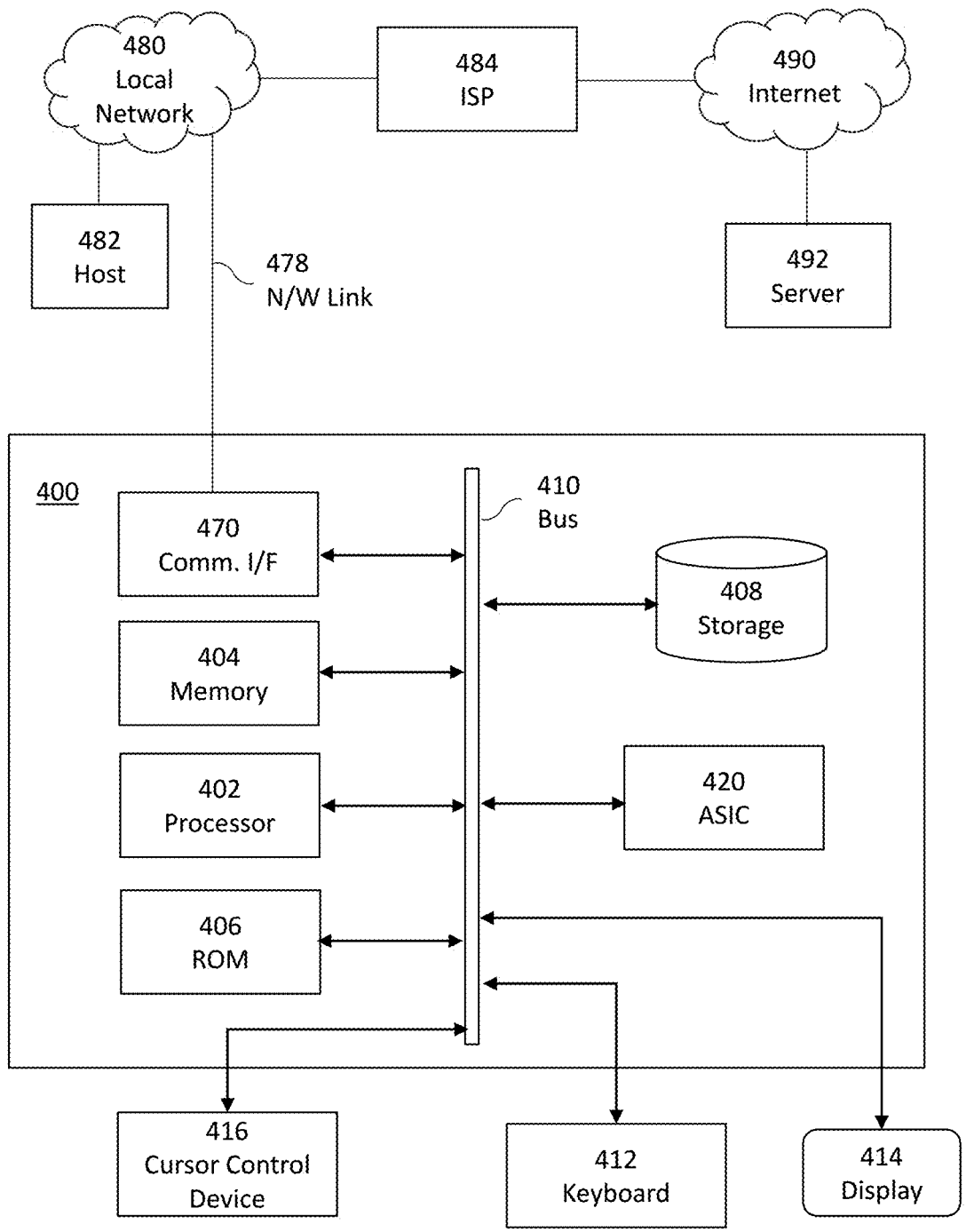
FIG. 4 illustrates an example of a networked computer system for executing computer-executable instructions for transforming 3D meshes associated with 3D models of articles into instructions for a computer-controlled machines, including flatbed knitting machines, in accordance with one embodiment of the invention.

FIG. 4 illustrates an example of the architecture described immediately above. In this arrangement, a computer system 400 is programmed via stored processor-executable instructions to interact with a server 492 in the production of instructions for operating, that is controlling the operation of, the target fabrication machines to produce a desired result in accordance with the present invention. In one embodiment, computer system 400 acts as a client to server 492 and is programmed to allow a user to construct and/or customize a 3D model of the article to be fabricated, which model is then passed to server 492 where the 3D model is converted to a 2D bitmap or other representation suitable for translation into instructions for the target fabrication machine. In another embodiment, server 492 is used by computer system 400 for both aspects of the operation (e.g., as a service-as-a-platform), and allows a user to interact with programs running on server 492 via a web browser or other client application.

As illustrated, computer system 400 generally includes a communication mechanism such as a bus 410 for passing information (e.g., data and/or instructions) between various components of the system, including one or more processors 402 for processing the data and instructions. Processor(s) 402 perform(s) operations on data as specified by the stored computer programs on computer system 400, such as the stored computer programs for running a web browser and/or for constructing and/or customizing a 3D model of the article to be fabricated and visualizing results of the server-based operations that will be described in greater detail below. The stored computer programs for computer system 400 and server 492 may be written in any convenient computer programming language and then compiled into a native instructions for the processors resident on the respective machines.

Computer system 400 also includes a memory 404, such as a random access memory (RAM) or any other dynamic storage device, coupled to bus 410. Memory 404 stores information, including processor-executable instructions, data, and temporary results, for performing the operations described herein. Computer system 400 also includes a read only memory (ROM) 406 or any other static storage device coupled to the bus 410 for storing static information, including processor-executable instructions, that is not changed by the computer system 400 during its operation. Also coupled to bus 410 is a non-volatile (persistent) storage device 408, such as a magnetic disk, optical disk, solid-state disc, or similar device for storing information, including processor-executable instructions, that persists even when the computer system 400 is turned off. Memory 404, ROM 406, and storage device 408 are examples of a non-transitory "computer-readable medium."

Computer system 400 may also include human interface elements, such as a keyboard 412, display 414, and cursor control device (e.g., a mouse or trackpad) 416, each of which is coupled to bus 410. These elements allow a human user to interact with and control the operation of computer system 400. For example, these human interface elements may be used for controlling a position of a cursor on the display 414 and issuing commands associated with graphical elements presented thereon. In the illustrated example of computer system 400, special purpose hardware, such as an application specific integrated circuit (ASIC) 420, is coupled to bus 410 and may be configured to perform operations not performed by processor 402; for example, ASIC 420 may be a graphics accelerator unit for generating images for display 414.

To facilitate communication with external devices, computer system 400 also includes a communications interface 470 coupled to bus 410. Communication interface 470 provides bi-directional communication with remote computer systems such as server 492 and host 482 over a wired or wireless network link 478 that is communicably connected to a local network 480 and ultimately, through Internet service provider 484, to Internet 490. Server 492 is connected to Internet 490 and hosts a process that provides a service in response to information received over the Internet. For example, server 492 may host some or all of a process that provides a user the ability to construct and/or customize a 3D model of an article to be fabricated, which model is then converted to a 2D bitmap or other representation suitable for translation into instructions for the target fabrication machine, in accordance with embodiments of the present invention. It is contemplated that components of an overall system can be deployed in various configurations within one or more computer systems (e.g., computer system 400, host 482 and/or server 492).

Figure 1:
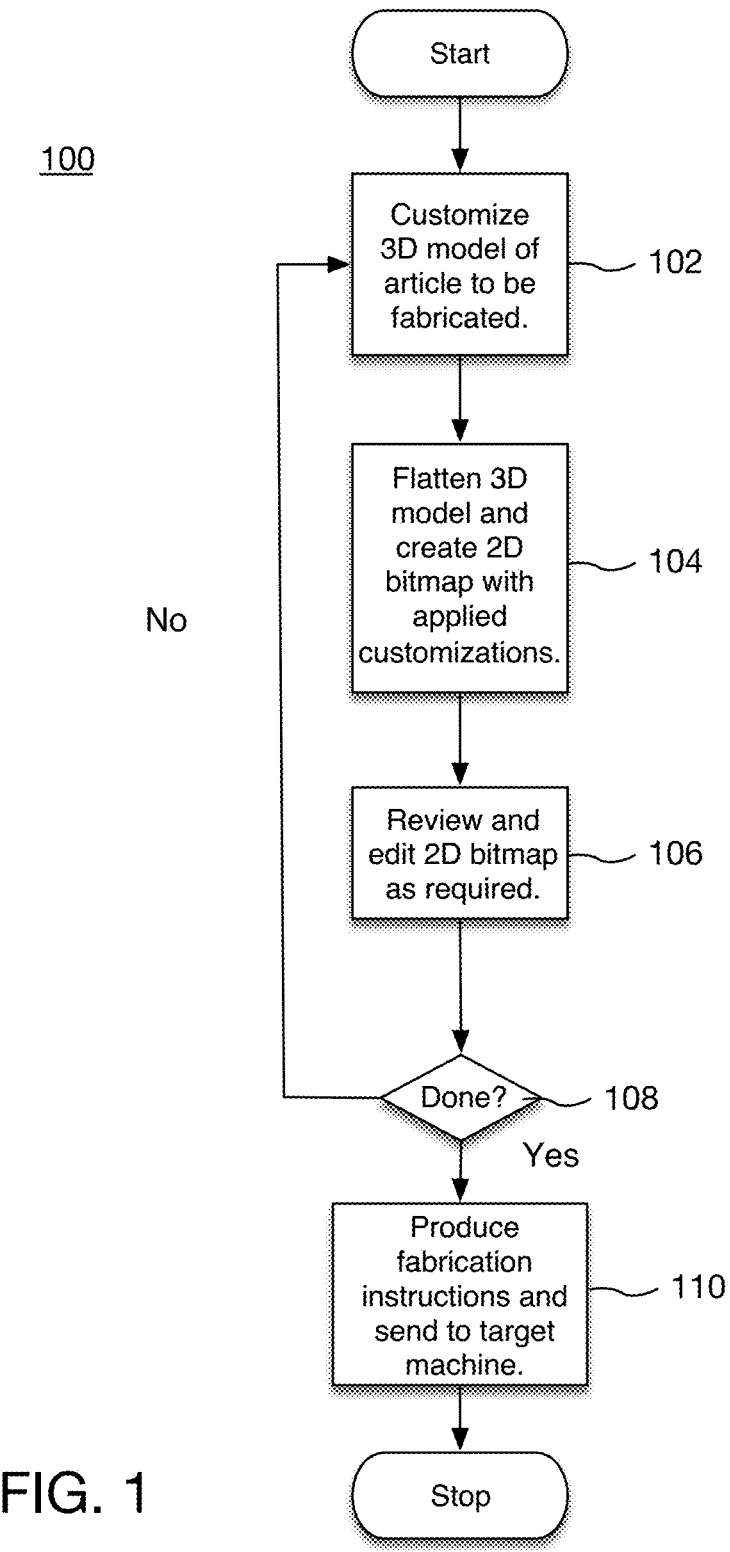
FIG. 1 illustrates a method for the fabrication of articles using computer-controlled machines, in accordance with one embodiment of the invention.

Referring now to FIG. 1, a process 100 for the fabrication of articles using computer-controlled machines according to one embodiment of the invention is illustrated at a high level. At step 102, a user interacts with a computer system to create and customize a 3D model of an article to be fabricated. Below, an example of an article to be fabricated on a flatbed knitting machine is discussed in detail. Generally, however, the workflow illustrated in FIG. 1 is applicable to any article to be manufactured by one or more computer-controlled machines for which computer-implemented instructions can be written. The present invention provides methods for automatically creating those instructions from a 3D model created and/or customized by a user. The 3D model may be one developed entirely by a user, for example, using a conventional 3D modeling application running on a local computer system or on a server accessed by a local computer system. Such modeling programs generally allow a user to develop a model manually, algorithmically, and/or by scanning a real-world object and importing the scan data. Models may also be recalled from a library and customized for a particular session. Regardless of how it is created, the 3D model represents a physical body as a collection of points in a 3D space, connected by various geometric "primitives" such as triangles, quadrangles, etc. The primitives define a surface of the body and are usually described by their vertices and edges.

The surface of the 3D model may also be defined by a texture map that includes details such as colors and textures. Generally, the texture map is a 2D construct, such as a bitmap image, although procedural textures may also be used. Often in the fabrication of custom articles, the user will create, as part of the modeling process, a custom texture map or "UV map" that forms part of the bespoke nature of the article to be fabricated. By "UV map," we mean a 2D image of a pattern or other texture that is to be projected onto the 3D model's surface. The "UV" in "UV map" refers to the bi-dimensional nature of the process: the letters "U" and "V" denote orthogonal axes of the 2D texture because, by convention, "X", "Y" and "Z" are used to denote orthogonal axes of the 3D model. UV maps allow for the application of designs, logos, patterns, and other features that will be produced as part of the finished article to be constructed.

When the 3D model with its associated texture map is ready, it is passed to a flattening process (step 104). The flattening process creates a 2D representation of the 3D model with its applied customizations (e.g., textures). The resulting 2D representation may be in the form of a bitmap and serves as a basis for producing machine instructions for the fabrication of the article represented by the 3D model. Before those instructions are generated, however, the user is afforded an opportunity to review and edit the 2D bitmap (step 106). While optional, this step is preferably included in the process 100 as the conversion from a 3D model to a 2D representation of the model may result in artifacts which can be edited/corrected at the individual pixel level. Any corrections thus made can then be reviewed, either in the form of the 2D bitmap and/or in the form of a revised 3D model. That is, the 2D bitmap can be represented as a 3D model in the same way as an original scan of an article can be so visualized. Or, the 2D bitmap may be applied as a texture map to the original 3D model for viewing. Thus, the above procedures 102-106 may be made iterative in nature ("No" branch of step 108) and the user may be afforded the opportunity to carefully refine his/her design until satisfied.

Once so satisfied ("Yes" branch of step 108), the 2D bitmap is used to produce fabrication instructions for the target fabrication equipment (step 110). For example, in the case of machines that operate in a raster-like fashion, the information provided in the 2D bitmap may be translated to cutting, stitching, knitting, welding, gluing, fastening, binding, folding, or other instructions for the fabrication machine(s). Each pixel in the 2D bitmap may represent, for example, a cut, a stitch, a weld, an application of glue or other fastener, a fold, or another operation to be performed by the fabrication machine(s). The translation into machine instructions will depend on the nature of the target fabrication machine(s). For example, a single pixel may be translated into one instruction or, more likely, more than one instruction. Where a cutting machine is involved, for example, the presence or absence of information in a pixel of the bitmap may determine the creation of a cutting instruction or an instruction not to cut a workpiece at a corresponding position. In other instances, information included in a pixel may define the nature of a stitch to be made, as well as the color of the yarn or thread to be used. Other target fabrication machines will have their own necessary instruction set and the 2D bitmap may be used to allocate instructions from that instruction set to spatial positions in or on a workpiece that represents the article to be manufactured.

Figure 2:
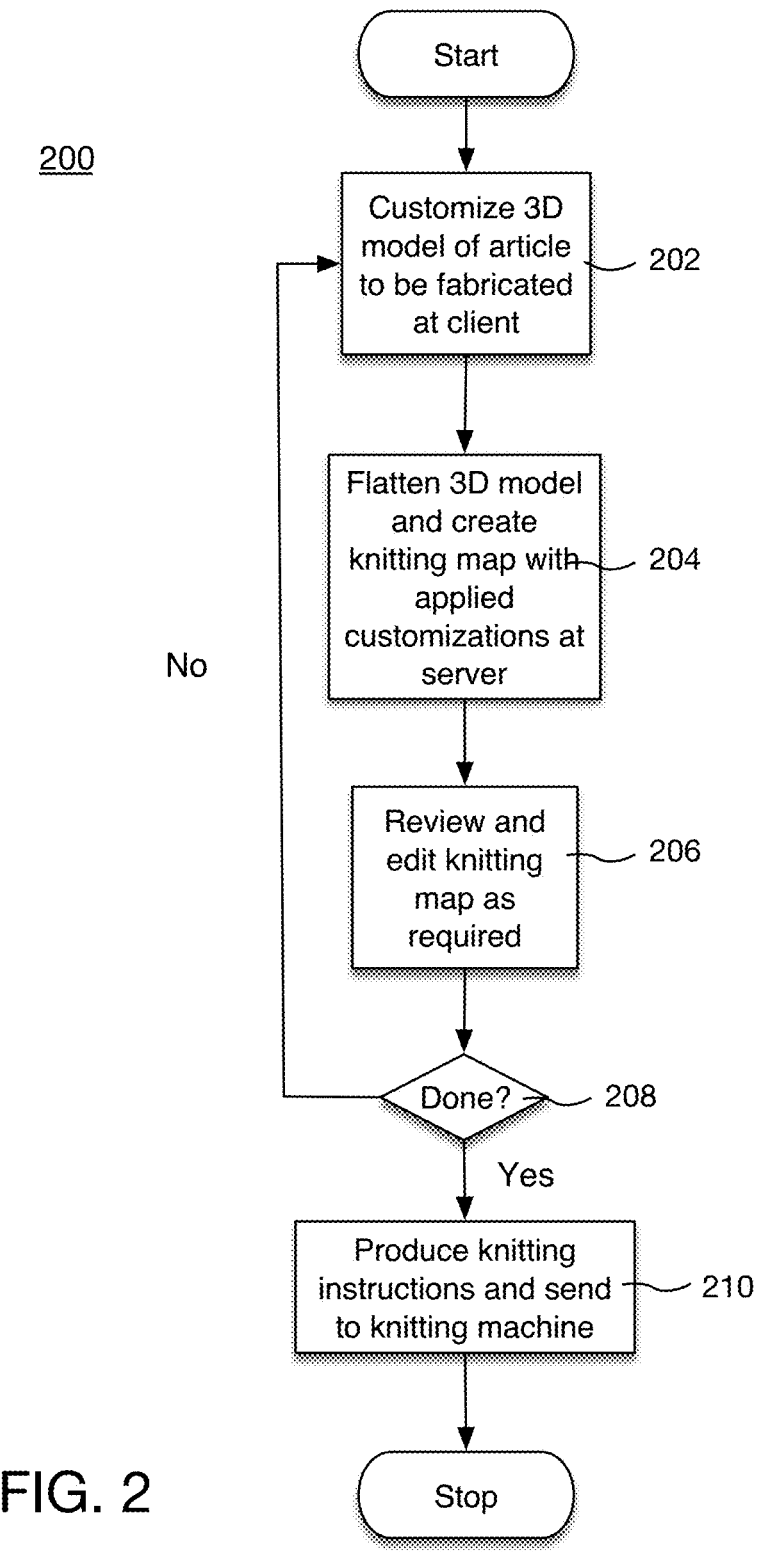
FIG. 2 illustrates a method for the fabrication of knitted articles using computer-controlled knitting machines, in accordance with one embodiment of the invention.

FIG. 2 illustrates an example of a process 200 for the fabrication of articles using computer-controlled machines highlighted in FIG. 1 as adapted for the fabrication of knitted articles using computer-controlled knitting machines, according to one embodiment of the invention. Knitting is a method of constructing articles by interlocking a series of loops of one or more yarns. At step 202, a user may interact with a computer system, such as computer system 400 discussed above, to create and customize a 3D model of a knitted article to be fabricated. As explained above, the 3D model may be one developed by a user, for example, using a conventional 3D modeling application running on a local computer system or on a server accessed by a local computer system, either manually, algorithmically, and/or by scanning a real-world object and importing the scan data. Alternatively, the 3D model may be one imported from a library and, optionally, customized for a particular session. The surface of the 3D model may be defined by a texture map that specifies a design, logo, or other highlights to be included in the knitted article.

At step 204, the 3D model with its associated texture map may be passed to a flattening process. The flattening process may create a 2D knitting map for the article to be fabricated based on the 3D model with its applied customizations textures). The 2D knitting map serves as a basis for producing knitting machine instructions for the fabrication of the knitted article represented by the 3D model. As discussed above, the user may be afforded an opportunity to review and edit the 2D knitting map (step 206), and any corrections can then be reviewed, either in the form of the 2D knitting map and/or in the form of a revised 3D model. Once the user is satisfied ("Yes" branch of step 208), the 2D knitting map is used to produce knitting instructions for the target knitting machine (step 210). For example, the 2D knitting map may be regarded as a checkerboard-like array in which each square (or pixel) represents a loop. The square may be coded (e.g., by color or other indicia) to provide information about the machining operations required, such as transferring loops, increasing or inactivating needles of the knitting machine, which bed of the knitting machine the needle is on, etc. Commercially available knitting machine software, which may execute on the computer system hosting the 2D knitting map, is available to transform such 2D knitting maps to g-code for a target knitting machine. For example, KnitPaint produced by Shima Seiki® of Wakayama, Japan produces g-code for Shima Seiki® knitting machines from pixel-level knitting maps. Additional parameters, such as tension settings, needle gauge, yarn type (elasticity), etc. may need to be provided in order for the knitting machine software to adapt the 2D knitting map to g-code in order to achieve a desired fit of the knitted article.

Figure 3:
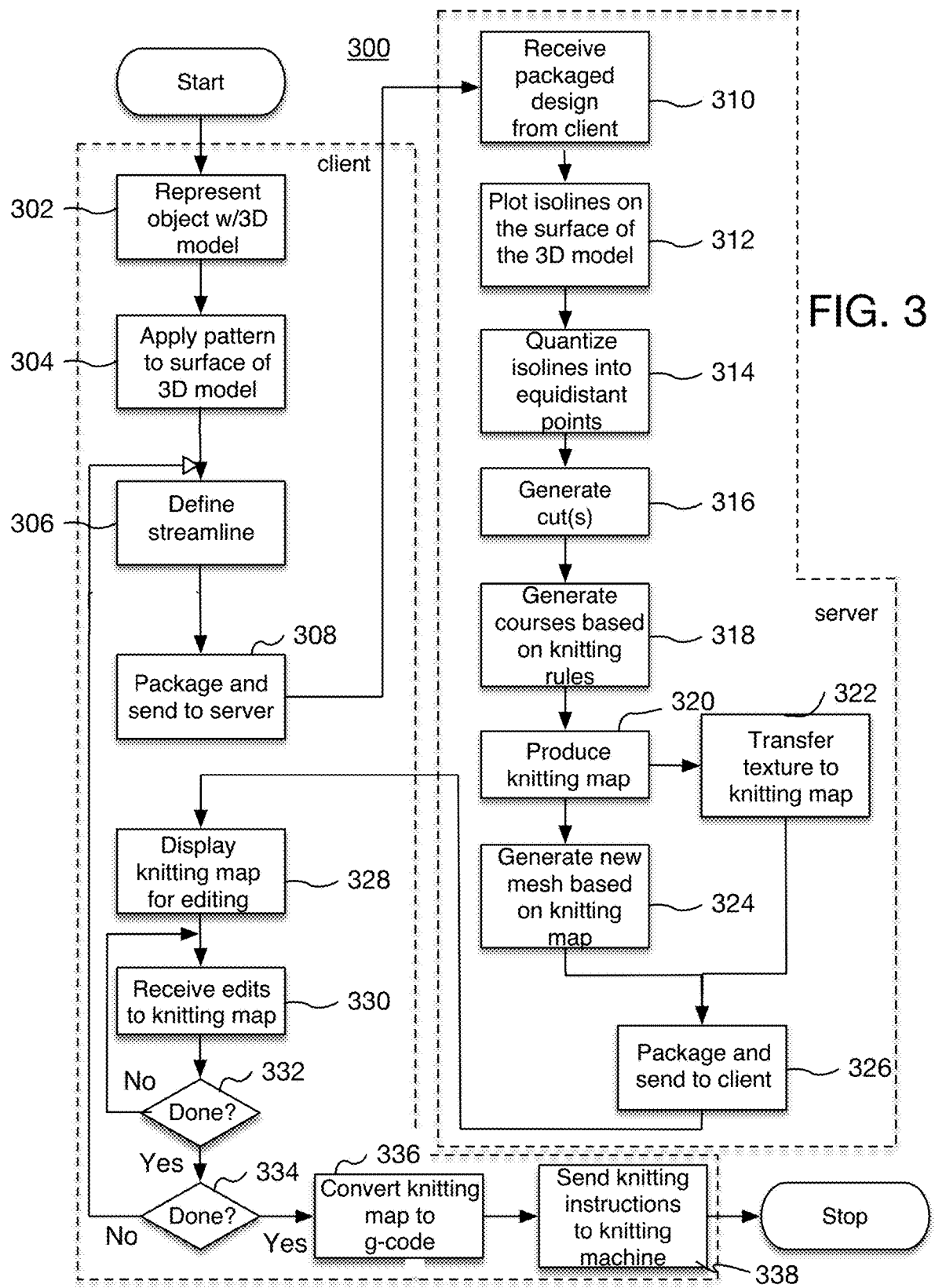
FIG. 3 illustrates further details concerning the process for fabrication of knitted articles using computer-controlled knitting machines illustrated in FIG. 2, in accordance with one embodiment of the invention.

Referring now to FIG. 3, an example of a process 300 for transforming 3D meshes associated with 3D models of articles into instructions for a computer-controlled flatbed knitting machine according to an embodiment of the invention is illustrated. By way of background, flatbed knitting machines are weft-knitting machines with needles arranged in a straight line in a flat plate called the bed. As noted above, knitting involves interlocking a series of loops of one or more yarns and weft knitting is a form of knitting in which loops are formed in a horizontal manner by adjacent needles. Flatbed knitting machines may have a single bed of needles or two beds opposite one another and are commonly used to produce a variety of articles, such as sweaters, scarves, and even footwear.

Computer-controlled knitting machines, including flatbed knitting machines, are capable of producing knitted articles with 3D geometries. To create such articles, a knitting pattern is needed that describes the article to be knitted as a series of 2D, line-by-line instructions. Popescu et al. have described an approach for creating knitting patterns from a 3D mesh. Popescu et al. "Automated generation of knit patterns for non-developable surfaces." *Humanizing Digital Reality: Design Modelling Symposium Paris* 2017, Springer Singapore, 2018. Briefly, given a 3D mesh, a user-defined knitting direction, and desired loop parameters for a target knitting machine, courses and so-called short rows are generated. In knitting, a wale is a column of loops running lengthwise, corresponding to a warp of a woven fabric, and a course is a crosswise row of loops, corresponding to the filling. Short rows, also known as partial or turning rows, are used for shaping purposes (e.g., to fit curved areas such as shoulders, and to impart design elements, such as staggered stripes). In the method of Popescu et al., the courses are sampled with the defined loop width for the target machine to create a final topology, which is turned into a 2D knitting pattern in the form of squares representing loops course by course.

Narayanan et al. "Automatic machine knitting of 3D meshes." *ACM Transactions on Graphics (TOG)* 37.3 (2018) described a computational approach to transform 3D meshes created by a conventional modeling program into instructions for a computer-controlled circular knitting machine. In the described method, an oriented, manifold 3D triangle mesh with two or more boundaries and a monotonic knitting time function specified by a scalar value at each vertex of the mesh are needed as inputs. Knitting machine instructions that approximate the mesh are developed in three main steps: First, a remeshing is performed to create a specially-structured knitting graph on the 3D surface. Second, tracing creates knitting instructions from the graph. Third, the knitting instructions are scheduled to needle locations on the knitting machine. The approach recognizes that knit objects have an intrinsic row-column structure, where rows arise from yarn-wise connections, and columns arise from loop-wise connections. The remeshing phase produces a directed graph to guide the row-column structure of the final knit object. Each node in the graph represents two knit loops in the fabricated pattern.

Figure 5:
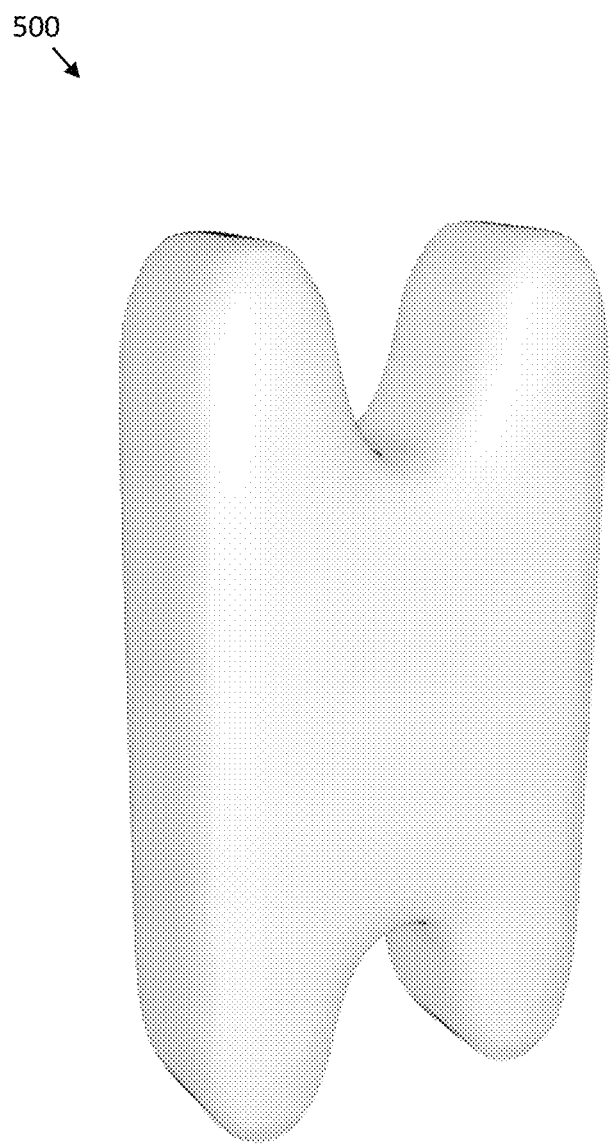
FIG. 5 illustrates an example of a 3D model of an article for producing instructions for a computer-controlled flatbed knitting machine, in accordance with one embodiment of the invention.

The present invention provides an automated method for transforming 3D meshes into instructions for a computer-controlled flatbed knitting machine. In one embodiment of the invention, pattern customization and flattening are merged into a single workflow, as represented in FIG. 3. The process 300 begins at step 302 by receiving as an input (e.g., at a computer system such as computer system 400 described above) a 3D model of an article. As before, the 3D model may be one that is retrieved from a library, or one generated by a user manually, algorithmically, or by transformation of a scan data obtained through scanning of a physical world article. For example, the 3D model may represent a piece of furniture that has been scanned or may even represent an individual's body, or part thereof, that has been scanned. FIG. 5 illustrates an example of a 3D model 500 of an article. Models based on scan data may be augmented or supplemented through user manipulation of the model in order to remove artifacts of the scanning process and/or to provide desired customizations in shape, appearance, etc.

Figure 6:
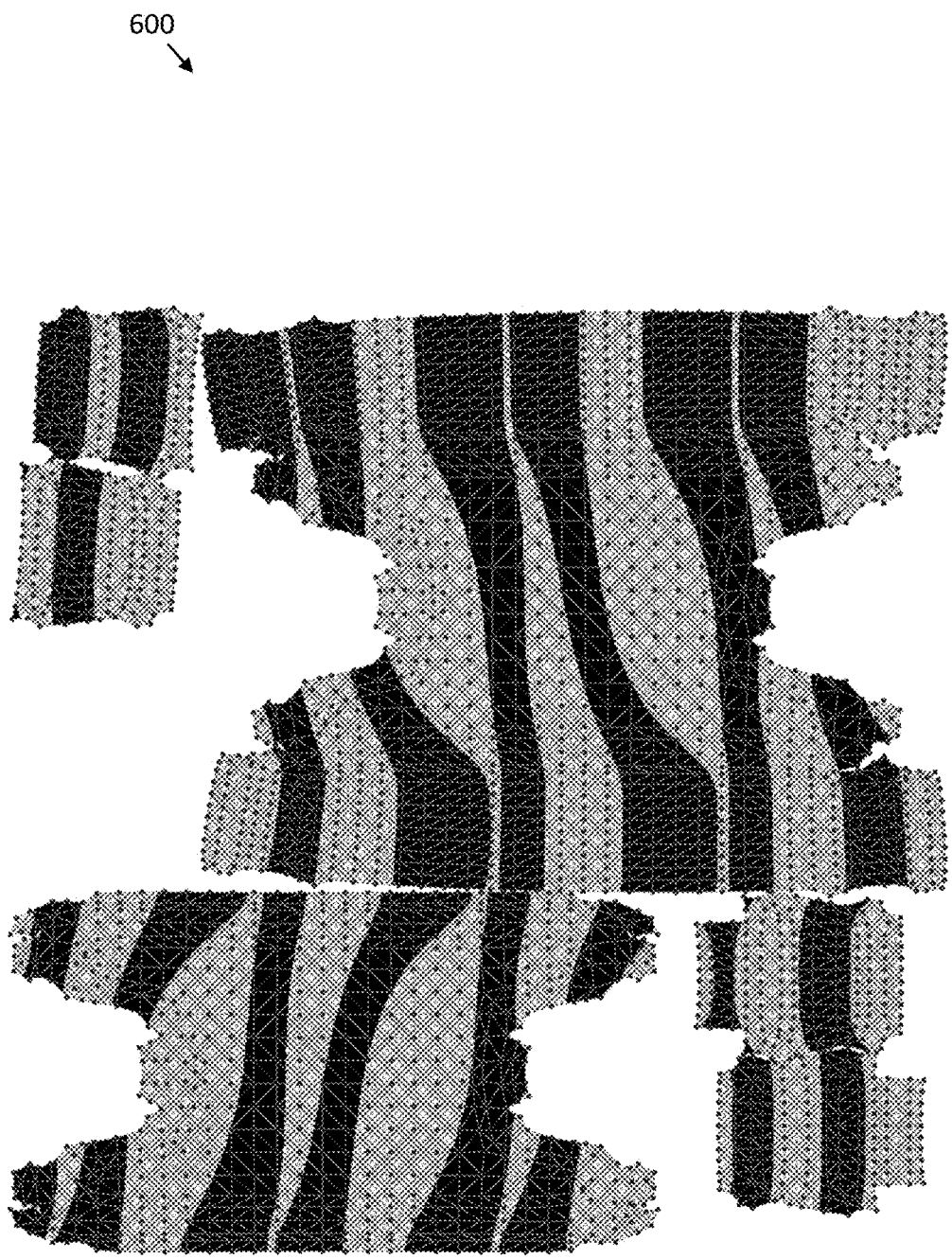
FIG. 6 illustrates an example of a UV map for the 3D model of the article shown in FIG. 5.
Figure 7:
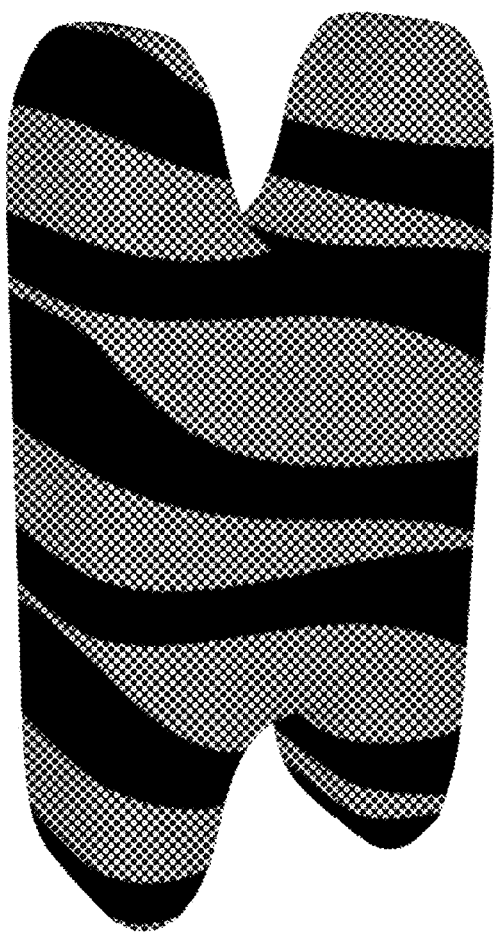
FIG. 7 illustrates an example of the 3D model of an article shown in FIG. 5 with an applied texture map.

Regardless of how it is created, the 3D model is preferably characterized by a 3D polygonal mesh that defines a surface of the article represented by the 3D model. As noted, that surface may be further defined by texture mapping (step 304). For example, details such as colors, patterns, shapes, etc. may be applied to customize the 3D model. This texture mapping may be performed using conventional 3D modeling tools, such as a personal computer or workstation running a 3D modeling program that allows for the described customization and visualization of the model. For example, in one embodiment of the invention, a UV map for the model may be provided or created and applied to the surface of the 3D model. Other processes can be used in lieu of UV mapping to add a pattern or texture to the 3D model. Customization of the 3D model through the application of surface textures or otherwise allows a user to create custom patterns, designs, logos, etc. FIG. 6 illustrates an example of a UV map 600 specifying a custom pattern for the 3D model 500 shown in FIG. 5, and FIG. 7 shows a textured 3D model 700, which is obtained by applying the UV map 600 to the 3D model 500.

Figure 8:
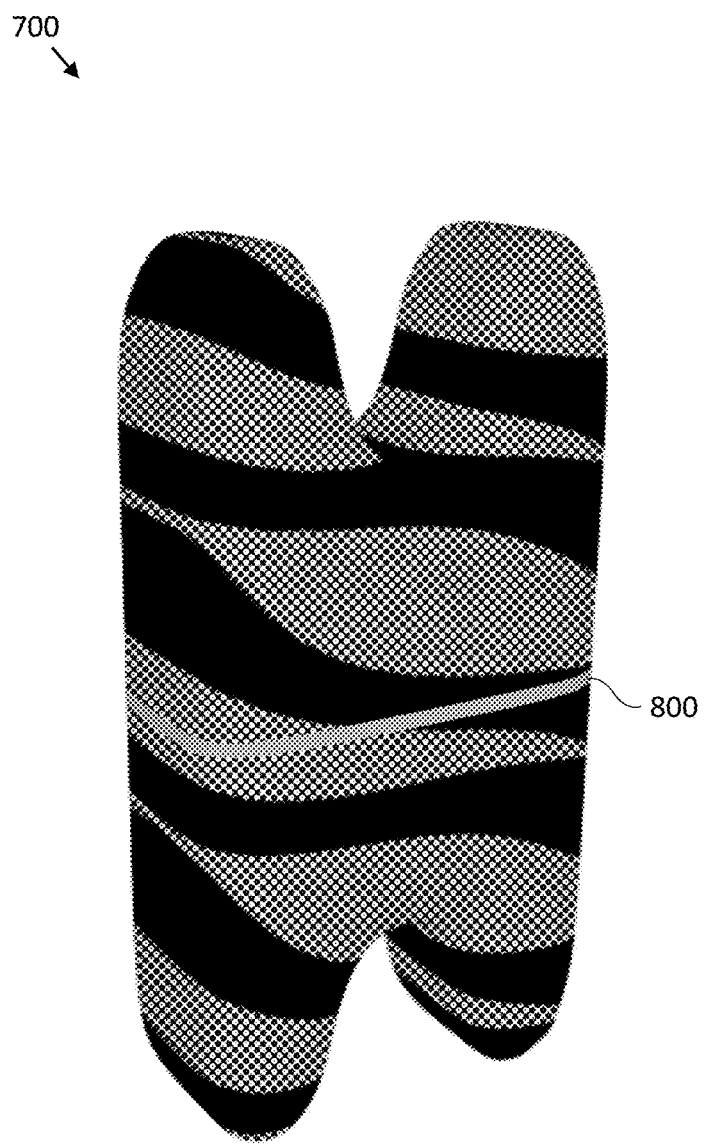
FIG. 8 illustrates an example of the 3D model of an article shown in FIG. 5 with a streamline defined thereon, in accordance with one embodiment of the invention.

Returning to FIG. 3, at step 306, one or more streamlines or curves are defined on the 3D model. In this context, a streamline may be regarded as a line drawn over the surface of the 3D model that loops back on itself. It will serve as an origin for computing isolines over the entire surface of the 3D model, which henceforth constrain and guide the resulting knitting direction. FIG. 8 illustrates an example of a streamline 800 drawn on the textured 3D model 700. In general, any line encompassing the circumference of the 3D model may be used as a streamline; however, in some embodiments of the invention, the streamline is chosen so that it falls over an approximate middle of the article as represented by the 3D model. In other instances, the streamline may be drawn nearer to one end of the article represented by the 3D model than another end thereof. Also, the streamline may be drawn laterally, vertically, or obliquely with respect to a longitudinal or lateral axis of the 3D model. It is not necessary that the streamline be symmetric with respect to any axis of rotation of the 3D model; however, in some instances, computational speed of various processes involved in the present method may be improved where the streamline is so drawn.

The same 3D modeling tool(s) used to create and/or customize the 3D model may be used to define (e.g., draw)

the streamline on the model and the resulting computer file that describes the customized model may be packaged and provided (step 308) to a server-based flattening tool, for example as a .glb file. In other instances, the model creation or importing and subsequent customization may be performed on a remote (e.g., cloud-based) system accessed by a client computer or workstation over a computer network or network of networks. This service-as-a-platform based approach allows the customization and subsequent flattening to be performed by the same cloud-based or network-based system, under the direction of a remote client at which a user is located.

Figure 9:
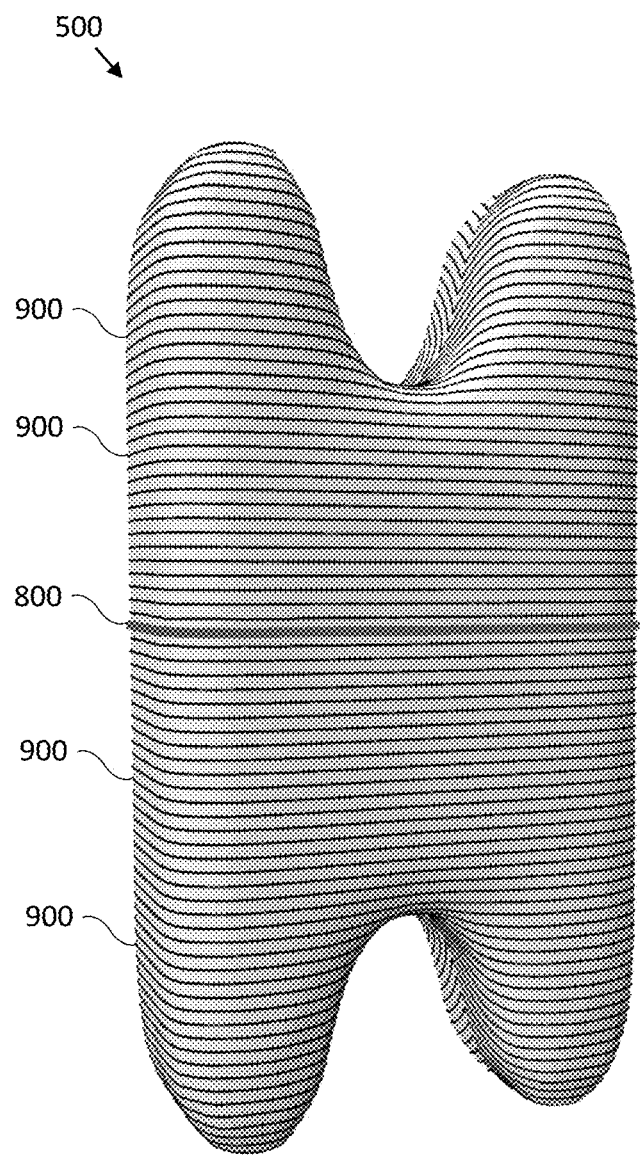
FIG. 9 illustrates the plotting of isolines over the surface of the 3D model of an article shown in FIG. 5 based on the streamline illustrated in FIG. 8, in accordance with one embodiment of the invention.

In step 310, the flattening process, whether performed at a remote server or a local computer system (from the standpoint of the user), receives the input texture-mapped 3D model that includes the streamline. Using the streamline as an origin, the flattening approach begins by defining a set of isolines over the surface described by the 3D mesh (step 312). In this context, isolines are geodesics that are equally spaced from the streamline and from one another. In some embodiments of the invention, the isolines are determined according to the so-called "heat method" for computing geodesic distances described by Crane et al., "Geodesics in Heat: A New Approach to Computing Distance Based on Heat Flow," *ACM Transactions on Graphics*, Vol. 32, No. 5 (September 2013). In other embodiments, other approaches for defining isolines may be used, for example, Sethian's Fast Marching Method, window propagation, etc. FIG. 9 illustrates an example of isolines 900 defined for the 3D model 500.

Figure 10:
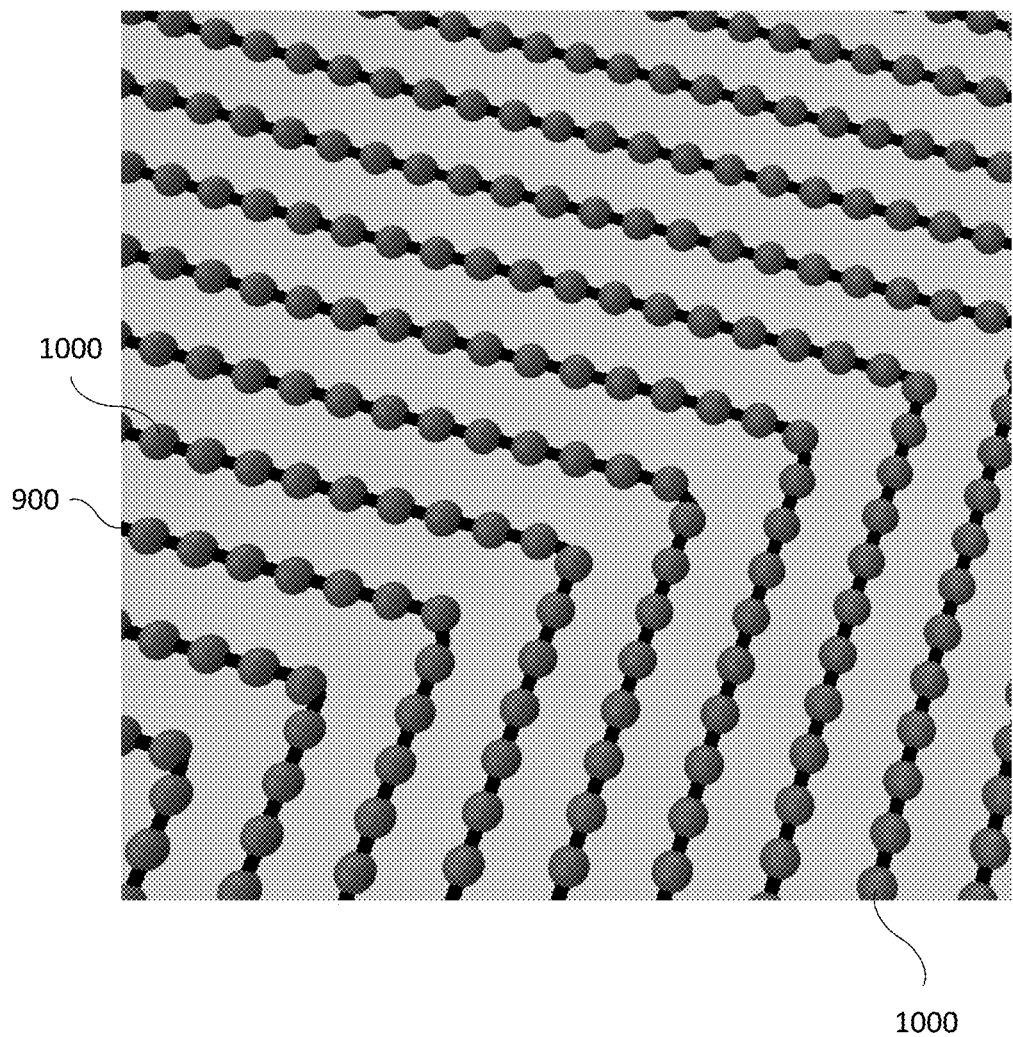
FIG. 10 illustrates the quantization of isolines with equidistant points along their respective lengths, in accordance with one embodiment of the invention.

Referring to FIG. 10, once the isolines 900 have been defined, quantization points 1000 may be determined along each of the isolines (step 314). That is, each of the isolines 900 is quantized into equidistant points 1000 along its respective length. These quantization points 1000 are ordered as neighbors.

Figure 11:
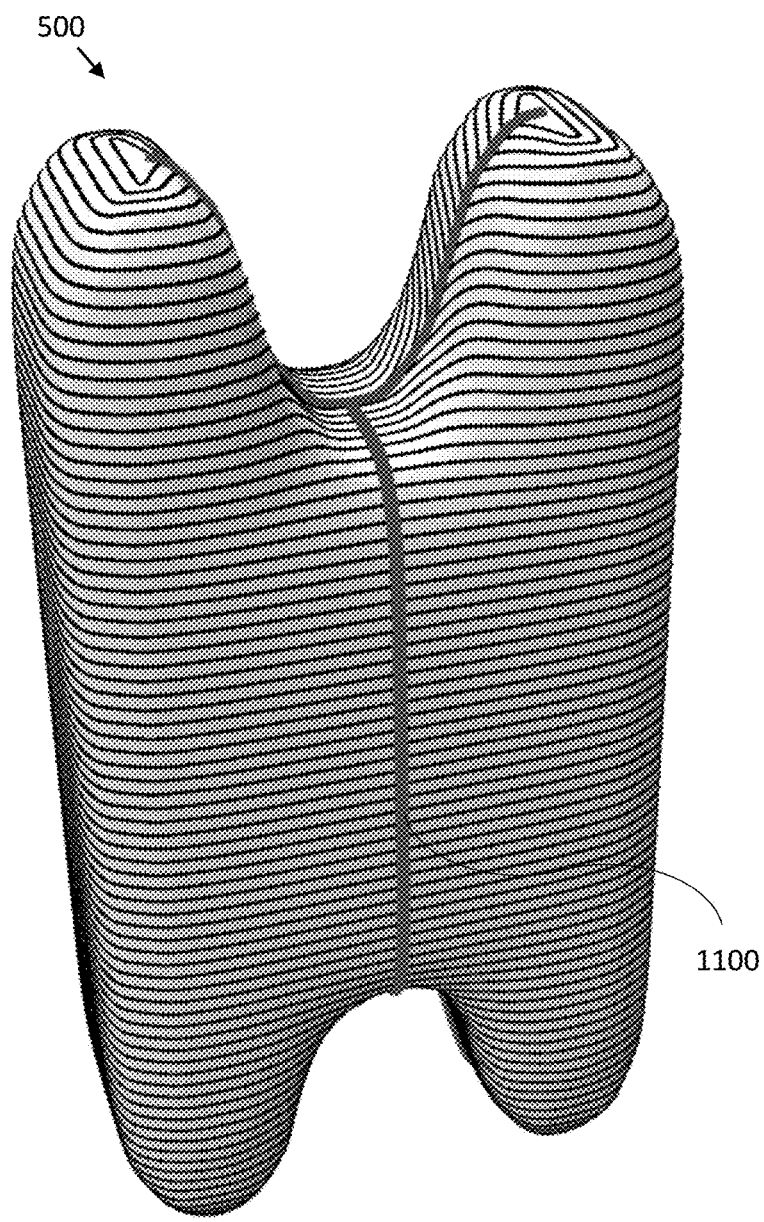
FIG. 11 illustrates the automatic generation of a cut line, in accordance with one embodiment of the invention.

With the quantization points defined, one or more cut lines are automatically defined on the surface (step 316). A cut line, such as cut line 1100 shown in FIG. 11, represents a seam in a completed knitted article and with respect to the 3D model (with or without texturing) will be a line that traverses every isoline, but only once per isoline. In one embodiment, the cut line is determined by first ordering the isolines and indexing the quantization points into groups matching the isolines, accounting for any nesting or branching isolines. Next, those of the isolines which are non-branching (isolines which contain no other isolines within them) are flagged and one of the non-branching isolines is selected as a starting point. One of the quantization points that lies along this selected isoline is chosen as a first point in the cut path. This can be any of the quantization points lying on the selected isoline; it will be defined as a "current point" and its respective isoline is the "current isoline." With the current point selected, for each of the isolines adjacent to the current isoline, the closest quantization point to the current point is determined and the cut path is drawn to connect the current point to the closest quantization points in the adjacent isolines. This is repeated, treating the adjacent isolines as new current isolines and the corresponding points of those isolines now connected by the cut path as current points, until every isoline of the 3D model is traversed. When the drawing operation is complete, the cut path will have an endpoint in each of the non-branching isolines. Optionally, the overall length of the cut path may be minimized by iteratively pushing the connected points towards any branching sites in the path to reduce the overall cut path length. In some cases, a cut path of minimized length for a given 3D model may provide an optimal cut path.

Figure 12:
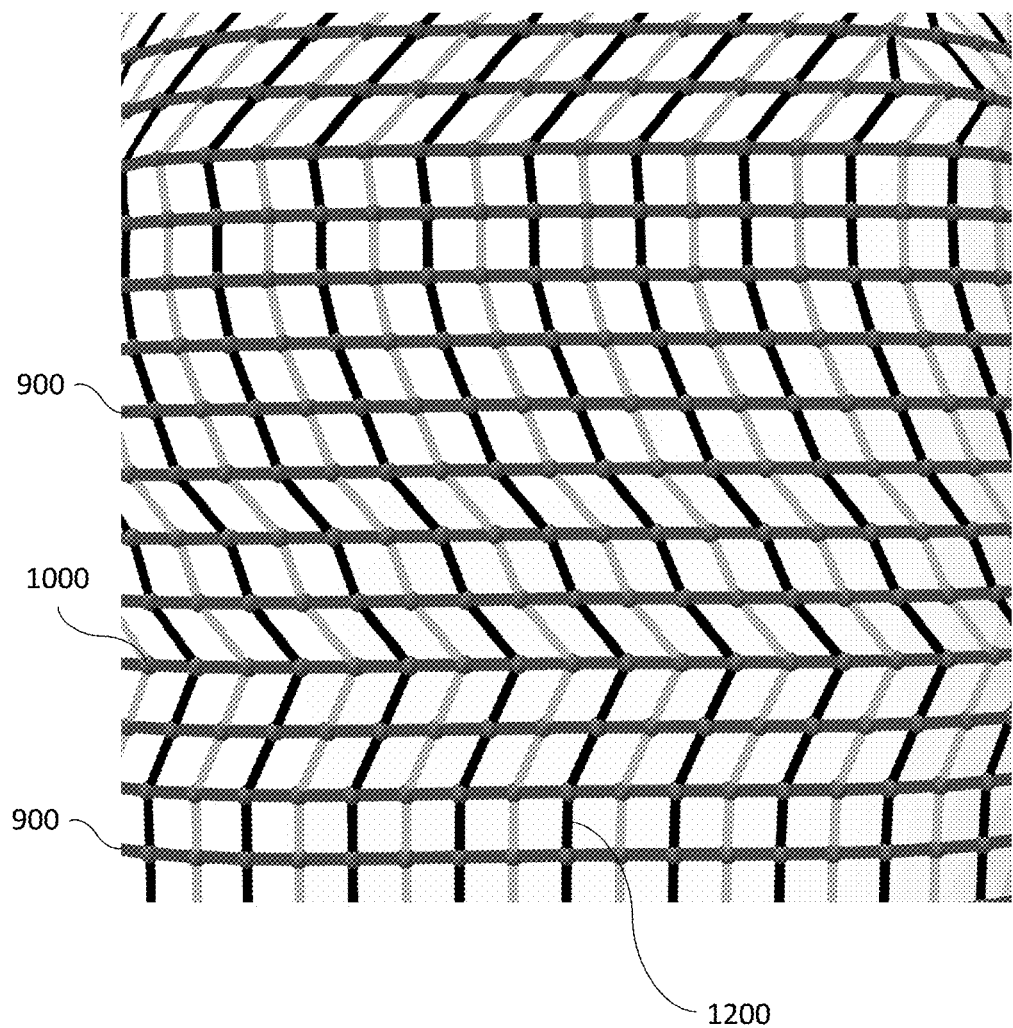
FIG. 12 illustrates an example of automated course generation for a 2D knitting map, in accordance with one embodiment of the invention.

Next in the overall flattening process, courses are generated by connecting quantization points 1000 of the isolines 900 based on knitting rules (step 318). FIG. 12 illustrates an example of a course 1200 generated by connecting the quantization points 1000 of isolines 900. As mentioned above, the knitting rules are, to a degree, defined by the target knitting machine for which the pattern is being generated. Applying the knitting rules essentially allows for an interpretation of the row by row action of the knitting machine, deriving goring (broadening of a width) and shaping. The 2D knitting map, which may be regarded as a flattened, that is, 2D, bitmap is then obtained (step 320), by defining respective locations of each stitch, and the texture pattern applied (step 322) to the original 3D model may be transferred to the 2D bitmap.

Figure 13A:
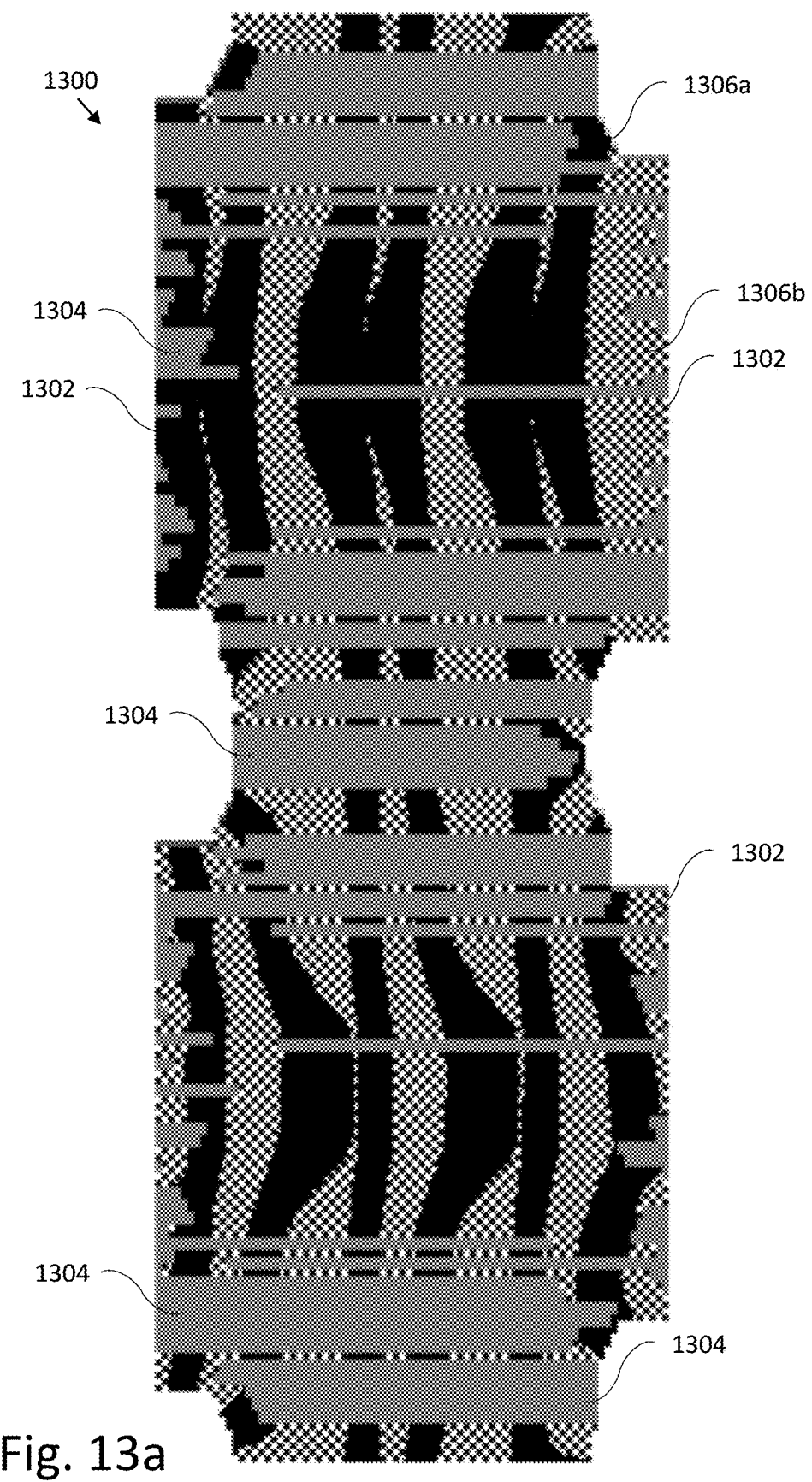
FIG. 13a illustrates an example of a 2D knitting map (in which a texture map is illustrated within the knitting regions) produced automatically from the 3D model illustrated in FIG. 5, in accordance with one embodiment of the invention.
Figure 13B:
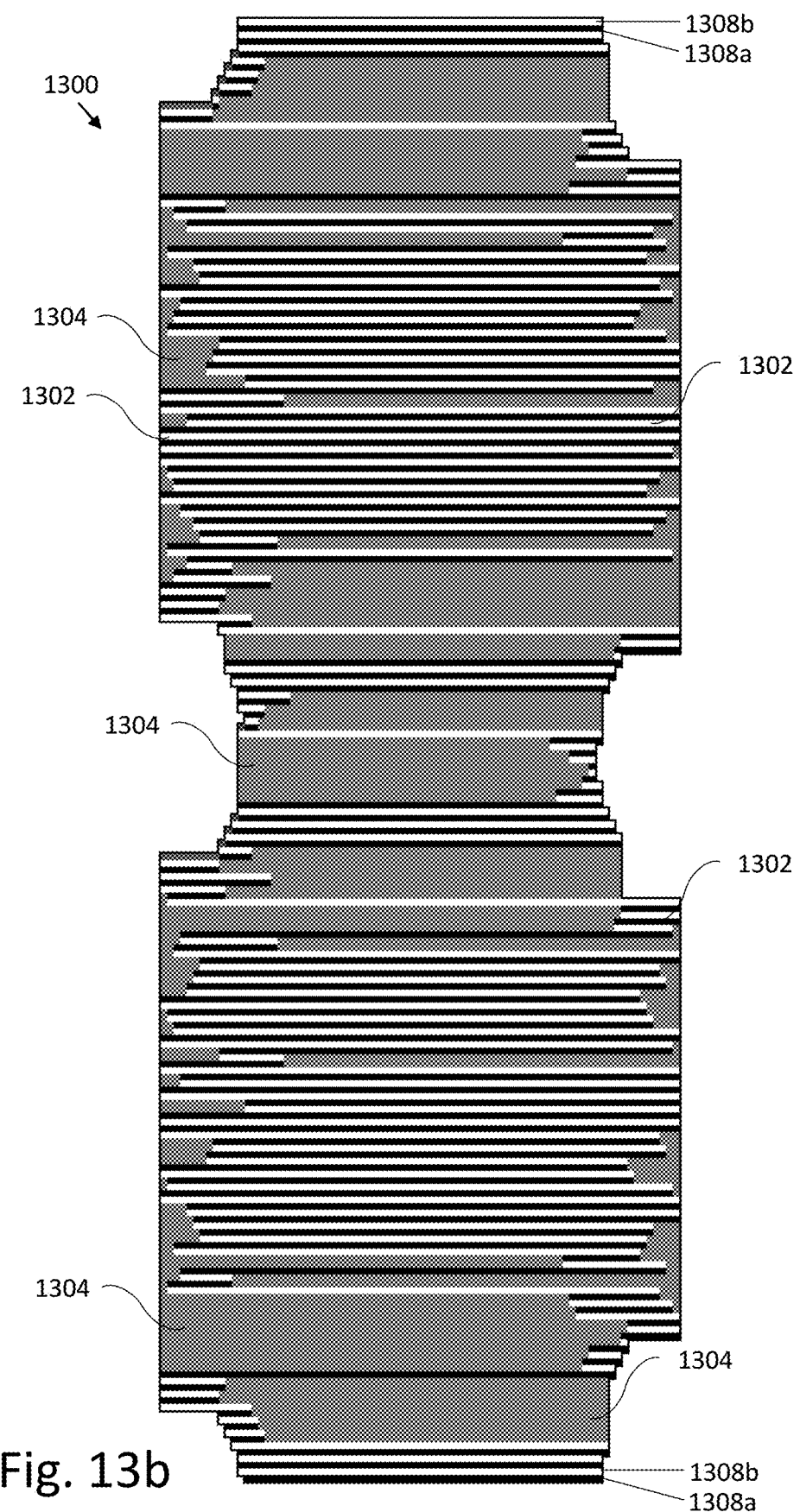
FIG. 13b illustrates an example of a 2D knitting map (in which rows of the 2D knitting map are illustrated within the knitting regions) produced automatically from the 3D model illustrated in FIG. 5, in accordance with one embodiment of the invention.

FIGS. 13*a* and 13*b* illustrate an example of a 2D knitting map 1300 produced by the above-described process. As shown in FIGS. 13*a* and 13*b*, a 2D knitting map 1300 may include knitting regions 1302 and goring (or shaping) regions 1304. Knitting instructions generated from the 2D knitting map 1300 may cause the knitting machine to knit one or more stitches in the knitting regions 1302, and no stitches in the goring regions 1304. When the knitting is performed, the goring regions 1304 may be collapsed (e.g., in the vertical direction) until the knitting regions 1302 bordering the goring regions 1304 touch one another, resulting in the partial shaping of the 3D knitted article. The other shaping of the 3D knitted article may be caused when corresponding edges of the knitted fabric are secured (e.g., sewed, buttoned, etc.) along the one or more cut lines. In FIG. 13*a*, the texture pattern from FIG. 7 has been depicted within the knitting regions 1302, whereas in FIG. 13*b*, the rows of the 2D knitting map 1300 have been depicted within the knitting regions 1302.

In FIG. 13*a*, it should be understood that the knitting machine may be programmed to use yarn with a first property (e.g., color, elasticity, etc.) when knitting stitches within the black regions 1306*a* of the knitting regions 1302, and use yarn with a second property (e.g., color, elasticity, etc.) when knitting stitches within the checkered regions 1306*b* of the knitting regions 1302. The use of black and checkered regions is only an example and it should be understood that the same information could have been visually represented using two different colors, two different patterns, etc.

In FIG. 13*b*, rows 1308*a*, 1308*b* of the 2D knitting map 1300 may correspond to the courses of a knitted article. Due to the close logical correspondence between the rows of the 2D knitting map 1300 and the courses of the knitted article, the rows of 1308*a*, 1308*b* of the 2D knitting map 1300 may be referred to as the "courses" of the 2D knitting map 1300. For ease of depiction, adjacent courses 1308*a*, 1308*b* of the 2D knitting map 1300 have been depicted in alternating grayscale tones. Courses 1308*a* represented by one of the grayscale tones (e.g., black) may represent a course that is knitted in a first direction (e.g., right), and courses 1308*b* represented by the other grayscale tone (e.g., white) may represent a course that is knitted in a second direction (e.g., left) opposite to the first direction. The use of grayscale tones to represent adjacent rows/courses of the 2D knitting map 1300 is only an example and it should be understood that the same information could have been visually represented using two different colors, two different patterns, etc.

This flattening process involves constructing quadrangles/triangles between the isolines by setting the locations of apexes of the quadrangles/triangles at the locations defined by the equidistant points on the isolines. Isolines require fast geodesic distance computation, which typically can only be performed quickly vertex to vertex. Because it is only vertex to vertex, retriangulating the original mesh—to include (as new vertices) all intersections that the input path makes with existing edges and vertices—allows for accurate calculations of distances from the path.

Liu et al., "Knitting 4D Garments with Elasticity Controlled for Body Motion," *ACM Transactions on Graphics*, Vol. 40, No. 4 (August 2021) describe an approach for transforming a 3D model to a flattened bitmap by assigning each quad/triangle of a 3D mesh corresponding wale and course indices. This process envisions each quad as a stitch and the stitches are mapped in order so as to be "joined" to one another, thereby defining the wales and courses. The present invention adopts a somewhat different approach. Unlike Liu et al., embodiments of the present invention employ a two bed jersey with elastic interlock. This allows for a framework that has minimal stretch and distortion. Further, whereas Liu et al. do suggest that apex diffusion improves 3D shaping, the present inventors have determined this to be true only in areas of relatively constant (i.e., Gaussian) curvature. Planar regions of an object should not have any diffused apexes. Each diffused apex creates some amount of goring, which results in 3D convexity in the final knitted article. To accommodate these demands, the present invention employs apex attraction, pulling apexes together into a relatively smooth goring edge, which gets pulled up by the knitting machine well, without holes in the result, once relief lines are added. The relief lines may be added automatically or manually. This is used in conjunction with apex diffusion.

In one embodiment then, both apex diffusion, to handle areas of constant curvatures, and apex attraction are employed in the same mesh, and even within the same wale. The apex diffusion and apex attraction function with weights, allowing a user to tune how much diffusion some areas will receive and how much attraction other areas will receive. This provides improved 3D shaping beyond the 3D processed tessellations initial output of wales and courses. Additionally, embodiments of the invention may add point relaxation that may provide better knits as well by tessellating more square-shaped stitch mesh elements in place of parallelogram-shaped elements.

Optionally, a new 3D mesh may be generated (step 324) from the 2D knitting map. Providing a new 3D mesh allows for iteration by the user. That is, the new 3D mesh can be passed back to the original 3D modeling program (e.g., which may be running on the user's local computer or running on the server is a service-as-a-platform model) (step 326), where the new 3D mesh can be visualized (step 328), reviewed; if desired, edited (step 330); and if desired, further edited ("No" branch of step 332). The visualization may be done using a shader application or another visualization routine. For example, the shader may receive the new 3D mesh and a texture defined by a 2D context (fillmap) and user-specified colors to indicate which areas of the 3D mesh should display which knit structure/yarn color. At the pixel/texel level, the shader may determine what the current structure should be (knit structures may be obtained from a library and/or may be user-specified), and with the current structure determined, then draw the diffuse and normal map. Yarn structures may be defined using quadratic Bezier curves and, as an optimization, Cardano's root-finding method may be used to derive basic curve structures. After defining the underlying curve structure, the shader may derive a signed distance field to give the curves a tunable/variable thickness, and derive a gradient from the line's midpoint. Using the gradient strength at any point on the line, the curvature/slope value of the yarn may then be derived, as may the direction from any point on the gradient to the curve's midpoint (e.g., by evaluating root values returned from a findRoots process). This allows for orienting the curvature value derived in the previous step. With the curvature and orientation of a current point on a current curve or yarn available, the curvature weights in x and y directions may be calculated and these values used to assign color. Lastly, depth may be derived from the gradient strength.

As part of the visualization and editing process, the user can perform pixel-level (stitch-level) editing of the 2D knitting map (step 330). This editing may result in a new customization of the article for production and the entire procedure may be iterated ("No" branch of step 334), until the user is satisfied with the result. Once so satisfied ("Yes" branch of step 334), the final version of the 2D knitting map is converted to machine instructions (step 336), and sent for execution on the target knit machine (step 338).

Thus, methods for fabrication of articles using computer-controlled machines from instructions for such fabrication automatically generated from 3D models of said articles, and in particular, methods for transforming 3D meshes associated with 3D models of articles into instructions for a computer-controlled flatbed knitting machine, have been described.

What is claimed is:

1. A method, comprising:
   for a three-dimensional (3D) model defined in a 3D space and characterized by a 3D polygonal mesh defining a surface of said 3D model, defining a streamline on said 3D model, said streamline being a line drawn over the surface of the 3D model that loops back on itself;
   using the streamline as an origin, defining a set of isolines over the surface defined by the 3D polygonal mesh;
   for each of the isolines, quantizing the isolines into equidistant quantization points along a length of the isoline;
   defining a cut line on the surface, said cut line representing a seam in a completed knitted article knitted by a computer-controlled flatbed knitting machine and traversing each of the isolines, but only once per respective isoline;
   generating courses by connecting the quantization points of the isolines based on knitting rules to produce a two-dimensional (2D) knitting map containing apexes of quadrangles or triangles of the 3D polygonal mesh, the 2D knitting map specifying locations of stitches for a knitted article;
   for a first portion of the 2D knitting map, decreasing a spatial distance between respective ones of the apexes within the first portion of the 2D knitting map, wherein an amount of the spatial distance decreased between respective ones of the apexes of the first portion of the 2D knitting map is based on a first weight value received from a user;
   converting the 2D knitting map to knitting instructions for the computer-controlled flatbed knitting machine; and
   transmitting said knitting instructions to said computer-controlled flatbed knitting machine so as to produce the knitted article in accordance with the knitting instructions.

2. The method of claim 1, wherein as a result of decreasing the spatial distance between respective ones of the apexes within the first portion of the 2D knitting map, the apexes form a smooth edge of the 2D knitting map.

3. The method of claim 1, further comprising for a second portion of the 2D knitting map separate from the first portion, increasing a spatial distance between respective ones of the apexes within the second portion.

4. The method of claim 3, wherein an amount of the spatial distance increased between respective ones of the apexes of the second portion of the 2D knitting map is based on a second weight value received from the user.

5. The method of claim 1, further comprising:
    prior to converting the 2D knitting map to the knitting instructions, presenting the 2D knitting map for review and edit by the user; and
    updating the 2D knitting map according to revisions made by said user.

6. The method of claim 5, further comprising, prior to converting the 2D knitting map to the knitting instructions, defining an updated 3D model based on an updated 2D knitting map reflecting said revisions made by said user, and repeating the steps of defining the streamline, defining the set of isolines, quantizing the isolines, defining the cut line, generating the courses, decreasing the spatial distance between respective ones of the apexes within the first portion of the 2D knitting map, and producing a further updated 2D knitting map using the updated 3D model.

7. The method of claim 1, further comprising:
    prior to converting the 2D knitting map to the knitting instructions, defining an updated 3D model based on the 2D knitting map; and
    updating the 2D knitting map using the updated 3D model.

8. The method of claim 1, wherein the 3D model is one of: selected from a library, produced from imaging of a physical article, produced by the user algorithmically, or produced by the user manually.

9. The method of claim 1, wherein the isolines are determined according to a heat method for computing geodesic distances.

10. The method of claim 1, wherein the cut line is determined by:
    ordering the isolines and indexing the quantization points into groups matching the isolines;
    selecting a non-branching one of the isolines as a current isoline starting point and selecting one of the quantization points that lies along the current isoline as a current point in the cut line;
    updating the cut line by, for each isoline adjacent to the current isoline, determining a closest quantization point in the adjacent isoline to the current point, and drawing the cut line to connect the current point to the closest quantization point in the adjacent isoline; and
    repeating the process of updating the cut line to connect subsequent closest points of subsequent adjacent isolines, treating immediately preceding adjacent isolines as new current isolines and immediately preceding closest quantization points of those isolines now connected by the cut line as current points, until every isoline of the 3D model is traversed.

11. The method of claim 1, further comprising:
    receiving a texture map representing a design, logo, pattern, or other features to be produced as part of the completed knitted article knitted by the computer-controlled flatbed knitting machine;
    applying the texture map to the 3D model; and
    immediately after the 2D knitting map has been produced, transferring information represented in the texture map from the 3D model to the 2D knitting map.

12. The method of claim 11, wherein the texture map specifies one or more of texture or color on the surface of the 3D model.

* * * * *